(12) United States Patent  
Juranitch

(10) Patent No.: US 10,054,044 B2  
(45) Date of Patent: *Aug. 21, 2018

(54) RENEWABLE COMBINED CYCLE LOW TURBINE BOOST

(71) Applicant: Plasma Tech Holdings, LLC, Bedford, NH (US)

(72) Inventor: James Charles Juranitch, Ft. Lauderdale, FL (US)

(73) Assignee: PLASMA TECH HOLDINGS, LLC, Bedford, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/410,111

(22) Filed: Jan. 19, 2017

(65) Prior Publication Data

US 2017/0198634 A1    Jul. 13, 2017

Related U.S. Application Data

(63) Continuation of application No. 13/825,120, filed as application No. PCT/US2011/001613 on Sep. 19, 2011, now Pat. No. 9,551,277.

(Continued)

(51) Int. Cl.
*F02C 3/20* (2006.01)
*B01D 53/10* (2006.01)
(Continued)

(52) U.S. Cl.
CPC ............... *F02C 3/20* (2013.01); *B01D 53/10* (2013.01); *C10J 3/18* (2013.01); *C10J 3/84* (2013.01);
(Continued)

(58) Field of Classification Search
CPC combination set(s) only.
See application file for complete search history.

(56) References Cited

U.S. PATENT DOCUMENTS 5,200,595 A * 4/1993 Boulos ............... H05H 1/28
                                                              219/121.48
5,865,023 A * 2/1999 Sorensen ........... F01K 23/068
                                                              60/39.12
(Continued)

FOREIGN PATENT DOCUMENTS

| WO | 2004048851 A1 | 6/2004 |
| WO | 2006128286 A1 | 12/2006 |
| WO | 2012039751 A2 | 3/2012 |

*Primary Examiner* — David Walczak
(74) *Attorney, Agent, or Firm* — Dykema Gossett PLLC

(57) ABSTRACT

A method and system for cost effectively converting a feedstock using thermal plasma, or other styles of gassifiers, into a feedwater energy transfer system. The feedstock can be any organic material, or fossil fuel. The energy transferred in the feedwater is converted into steam which is then injected into the low turbine of a combined cycle power plant. Heat is extracted from gas product issued by a gassifier and delivered to a power plant via its feedwater system. The gassifier is a plasma gassifier and the gas product is syngas. In a further embodiment, prior to performing the step of extracting heat energy, there is provided the further step of combusting the syngas in an afterburner. An air flow, and/or EGR flow is provided to the afterburner at a rate that is varied in response to an operating characteristic of the afterburner. The air flow to the afterburner is heated.

20 Claims, 2 Drawing Sheets

Related U.S. Application Data

(60) Provisional application No. 61/403,980, filed on Sep. 24, 2010.

(51) Int. Cl.
  *C10J 3/18* (2006.01)
  *F23J 15/02* (2006.01)
  *F02C 6/18* (2006.01)
  *F02C 9/20* (2006.01)
  *C10J 3/84* (2006.01)

(52) U.S. Cl.
  CPC ............... *F02C 6/18* (2013.01); *F02C 9/20* (2013.01); *F23J 15/025* (2013.01); *B01D 2257/2045* (2013.01); *B01D 2257/302* (2013.01); *B01D 2257/404* (2013.01); *B01D 2257/602* (2013.01); *C10J 2200/12* (2013.01); *C10J 2300/0946* (2013.01); *C10J 2300/1238* (2013.01); *C10J 2300/1606* (2013.01); *C10J 2300/1653* (2013.01); *C10J 2300/1869* (2013.01); *C10J 2300/1876* (2013.01); *F05D 2220/32* (2013.01); *F05D 2220/72* (2013.01); *F23J 2215/10* (2013.01); *F23J 2215/20* (2013.01); *F23J 2217/104* (2013.01); *F23J 2219/60* (2013.01)

(56) References Cited

U.S. PATENT DOCUMENTS

| | | | | |
|---|---|---|---|---|
| 7,347,051 | B2* | 3/2008 | Christensen | C10G 21/003 208/309 |
| 2007/0186474 | A1* | 8/2007 | Rabovitser | B01J 19/088 48/197 R |
| 2008/0104887 | A1* | 5/2008 | Tsangaris | C10J 3/00 48/197 R |
| 2008/0309087 | A1* | 12/2008 | Evulet | F02C 3/34 290/52 |
| 2009/0064581 | A1 | 3/2009 | Nielsen | |
| 2009/0133407 | A1* | 5/2009 | Sawyer | C10J 3/18 60/780 |

\* cited by examiner

RENEWABLE COMBINED CYCLE LOW TURBINE BOOST

CROSS-REFERENCE TO RELATED APPLICATIONS

This application is a continuation of U.S. application Ser. No. 13/825,120, filed 7 Aug. 2013 (the '120 application), now U.S. Pat. No. 9,551,277; which is a National Stage application of International application no. PCT/US2011/001613, filed 19 Sep. 2011 (the '613 application); which claims priority from U.S. provisional application No. 61/403,980, filed 24 Sep. 2010 (the '980 application). The '120 application, the '613 application, and the '980 application are each hereby incorporated by reference as though fully set forth herein.

BACKGROUND OF THE INVENTION

Field of the Invention

This invention relates generally to processes and systems for generating electrical power, and more particularly, to a process and system that extracts heat energy from the output gas of a gassifier and provides the extracted heat energy to the system for generating electrical power via its associated combined cycle low turbine system. Many of the attributes of this invention can be applied to any heat transfer process including simple steam generation.

Description of the Related Art

There is significant interest in renewable energy projects. Thermal plasma has consistently distinguished itself as a high efficiency, low emissions gasification process for just about any feedstock, and has been identified as one of the most desirable processes for use in producing energy from renewable fuels.

If an analysis of plasma municipal solid waste (MSW) or other renewable fuels relative to other energy facilities is conducted, it becomes apparent that the lack of existing plasma projects is not exclusively the result of technological problems, but also results from the relatively poor economics associated with this technology. Plasma technology is not inexpensive when compared to disposition of waste using landfill, incineration, or conventional gasification.

Many plasma projects fail at the onset, notwithstanding extensive initial marketing efforts, usually as a result of inadequate financing and low or nonexistent profitability. Recently some states have allocated bonuses for development and use of renewable energy, and such efforts have stimulated the use of plasma systems in the production of energy. Unfortunately, it is expected that this modest boon to plasma usage will be short lived, as it represents an artificial market that is a poor model on which to build a business. This is particularly problematical when one considers that these facilities are expected to produce power cost effectively for at least fifty years.

Many plasma projects in the past have pinned false hopes on high tipping fees for hazardous waste without fully understanding the complications that are associated with such materials. The handling of these materials is not only complex and expensive, but also potentially dangerous if not properly engineered. The entire process and the facility itself thus become unduly expensive.

Most counties emphatically state that they do not desire that large quantities of hazardous waste be transported through their communities. However, large quantities of such waste must be generated if the facility is to achieve profitability. The production and delivery of the hazardous waste have to be carefully coordinated since it is dangerous to store biological and other hazardous waste feedstock.

The process and system of the present invention overcomes the economic hurdles noted above for a plasma system. It is to be understood, however, that the invention herein described is not limited to the use of a plasma gassifier. In some embodiments of the invention, conventional gassifiers can be employed, or inductively heated gassifiers, or inductively heated and plasma assisted gassifiers. The use of a plasma gassifier in the practice of the present invention, however, increases overall system effectiveness.

The system of the present invention is simple, flexible, and very energy efficient. In short, it produces a large amount of renewable power from a feedstock such as Municipal Solid Waste ("MSW"), for a very small capital investment. Any feedstock can be used, including, for example, biomass or algae. MSW is an example of a common renewable feedstock.

It is, therefore, an object of this invention to provide a simple and cost-effective renewable energy system.

It is another object of this invention to provide a renewable energy system that can consume virtually any feedstock.

It is also an object of this invention to provide a simple and cost-effective renewable energy system that can use a conventional gassifier.

It is a further object of this invention to provide a simple and cost-effective renewable energy system that can use a plasma gassifier.

It is yet another object of this invention to provide a renewable energy system that can use an inductively heated gassifier or an inductively heated gassifier that is plasma assisted.

It is additionally an object of this invention to provide a process and system for enhancing the thermal efficiency of a Rankine or other steam process, or any process that requires heat.

It is yet a further object of this invention to provide a process and system for enhancing the thermal efficiency of a combined cycle power plant.

It is also another object of this invention to provide a process and system for extracting heat energy from a renewable energy system that can consume virtually any feedstock and providing the heat energy to a Rankine or other steam process, or any process that requires heat.

It is yet an additional object of this invention to provide a process and system for extracting heat energy from a plasma gassifier and providing the heat energy to any process that requires heat, including a combined cycle power plant.

SUMMARY OF THE INVENTION

The foregoing and other objects are achieved by this invention which provides, in accordance with a first method aspect thereof, a method of extracting heat energy from a gassifier and delivering the heat energy to a combined cycle power plant low turbine. In accordance with the invention, the method includes the steps of:

extracting heat energy from a gas product issued by the gassifier; and delivering the extracted heat energy to a feedwater system of a combined cycle power plant.

It is to be understood that the invention is not limited to the use of feedwater to effect the energy transfer. Make up water can also be used to transfer energy, and accordingly, the use of the term "feedwater" herein shall be construed, in respective embodiments, to include or be supplanted by make up water.

In one embodiment, the gassifier is a plasma gassifier. The gas product is, in some embodiments, syngas, and prior to performing the step of extracting heat energy there is provided the further step of combusting the syngas in an afterburner. In an advantageous embodiment, there is provided the further step of injecting recirculated exhaust gas into the afterburner. In a further embodiment, there is provided the further step of varying the flow rate of the recirculated exhaust gas in response to an afterburner temperature characteristic.

In other embodiments, there is further provided the step of supplying an air flow to the afterburner. The step of supplying an air flow to the afterburner is performed, in some embodiments, in excess of stoichiometric to cool the outlet charge of the afterburner and reduce the emissions in the afterburner. In yet other embodiments, the step of supplying air flow to the afterburner is performed at an approximately stoichiometric level or with less than stoichiometric air injection. This step of supplying an air flow to the afterburner is, in some embodiments, performed at a variable flow rate. The flow rate can be varied in response to an air/fuel ratio, or in other embodiments, in response to an afterburner temperature characteristic. In a further embodiment, there is further provided the step of preheating the air flow to the afterburner to reclaim energy from the system.

In an advantageous embodiment of the invention, the gassifier is a plasma gassifier, and there is provided the further step of cooling a plasma torch by using an incoming feedwater from the power plant. In yet another embodiment, there is provided the further step of supplementing the extracted heat energy with a selectable one of a liquid and a gaseous fuel, and an oxidant. Natural gas, propane, or any liquid or gaseous fuels are used in some embodiments of the invention to supplement the extracted heat energy. Additionally, there is provided in some embodiments the step of subjecting the gas product to a ceramic media filter is used to reduce emissions.

In accordance with a second method aspect of the invention, there is provided a method of providing heat energy from a plasma gassifier to a power plant. In accordance with the invention, the method includes the steps of:

issuing a gas product from the plasma gassifier delivering the gas product to a heat exchanger arrangement;

delivering feedwater from the power plant to the heat exchanger arrangement;

extracting heat energy from the gas product in the heat exchanger arrangement;

delivering the extracted heat energy to the feedwater from the power plant in the heat exchanger arrangement; and returning the feed water with the extracted heat energy in the form of steam to a low steam turbine of a combined cycle power plant.

In one embodiment of this second aspect of the invention, the plasma gassifier is provided with a plasma torch, and there is provided the further step of cooling the plasma torch with the feedwater of the power plant. In a further embodiment, prior to performing the step of delivering the gas product to the heat exchanger arrangement, there is provided the further step of combusting the syngas in an afterburner. Additionally, there is further provided the step of supplying an air flow to the afterburner. The step of supplying an air flow to the afterburner is performed, in some embodiments, at a variable flow rate responsive to an operating condition of the afterburner.

In an advantageous embodiment, there is provided the further step of injecting recirculated exhaust gas (EGR) into the afterburner. The step of injecting recirculated exhaust gas (EGR) into the afterburner is performed at a variable flow rate that is responsive to an operating condition of the afterburner. In a still further embodiment, there is provided the further step of supplementing the heat energy extracted in the step of extracting heat energy from the gas product in the heat exchanger arrangement with a selectable one of a liquid and a gaseous fuel, and an oxidant.

BRIEF DESCRIPTION OF THE DRAWING

Comprehension of the invention is facilitated by reading the following detailed description, in conjunction with the annexed drawing, in which.

DETAILED DESCRIPTION

Figure 1:
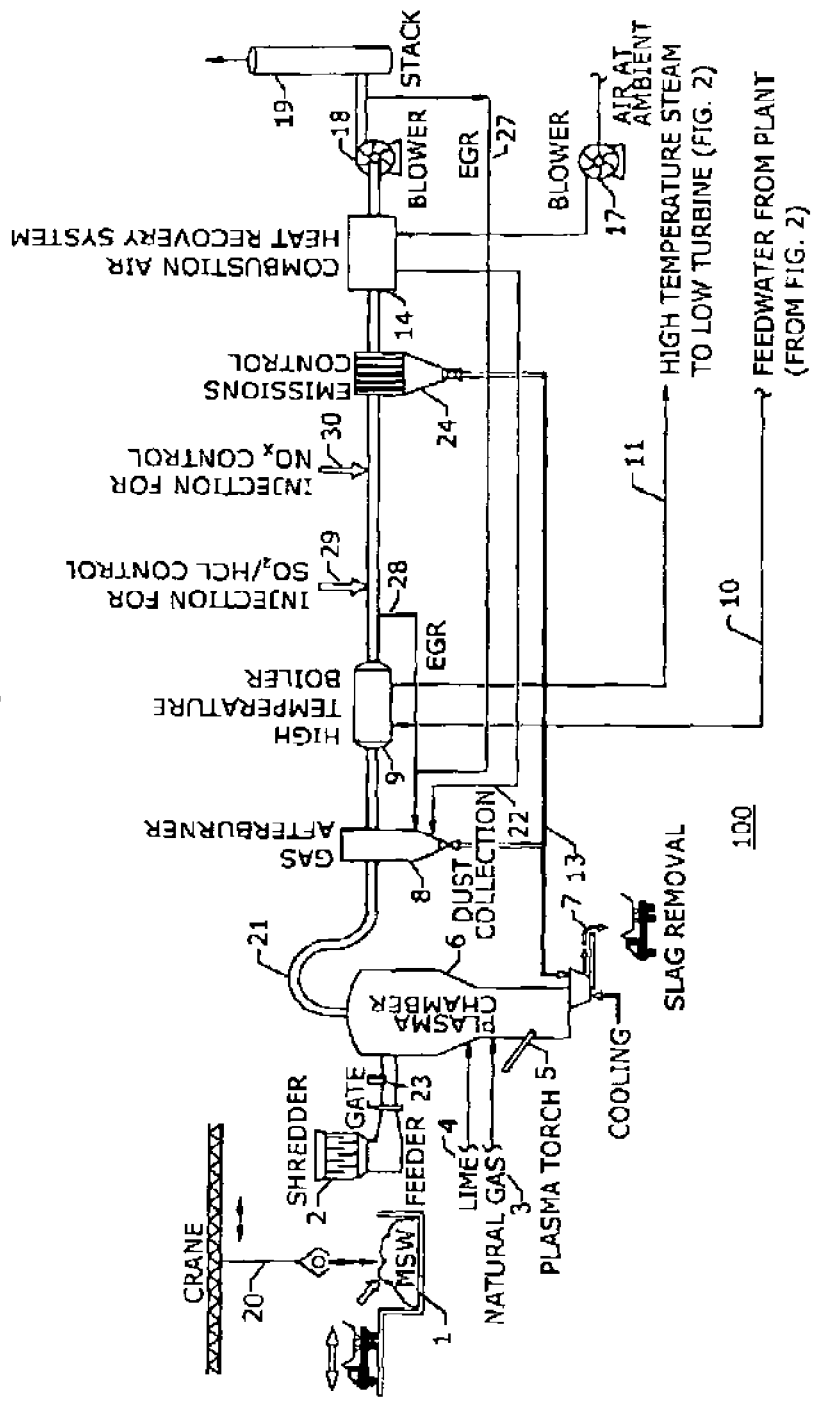
FIG. 1 is a simplified schematic representation of a process and system for generating energy from a renewable energy source constructed in accordance with the principles of the invention.

FIG. 1 is a simplified schematic representation of a process and system for generating energy from a renewable energy source constructed in accordance with the principles of the invention. As shown in this figure, municipal solid waste or other feedstock, designated as MSW 1, is delivered in this specific illustrative embodiment of the invention to system 100 by a crane 20. The feedstock can be any organic material, inorganic mix, or fossil fuel. Crane 20 transfers MSW 1 to a shredder 2. The shredded feedstock (not shown) is then delivered to a plasma chamber 6. It is to be understood that any other form of gassifier can be employed in the practice of the invention.

The feed system, which includes shredder 2, compresses the incoming feedstock MSW 1 so as to minimize the introduction of air. An in-line high density flow meter 23 monitors feedstock velocity to provide instantaneous feedstock flow rate data (not specifically designated). Plasma chamber 6, or other conventional gassifier is, in this specific illustrative embodiment of the invention, advantageously operated in a pyrolysis mode, or in air and/or oxygen combustion boosted modes of operation. Additives such as lime 4 are added, in this embodiment, to the gassifier to control emissions and improve the quality of an output slag 7.

Methods of chemically boosting heat such as with the use of natural gas at natural gas injection port 3 can be used in the practice of the invention. Additionally, propane injection (not shown), or any other fuel oxidation (not shown) can be used to supplement the heat input by plasma torch 5.

In this embodiment of the invention, plasma torch 5 has its cooling water flowing in series with feedwater inlet 10. The series connection of such feedwater to plasma torch 5 and associated components are not shown in the figure for the sake of clarity. Such routing of the plasma torch cooling water obviates the need for a cooling tower and increases the overall efficiency of the plant.

A syngas product is supplied via a syngas line 21 to an unlined or refractory lined afterburner 8 to extract the chemical heat from the product gas. In this embodiment of the invention, the afterburner is a conventional thermal oxidizer or a chamber specifically designed to combust the syngas. In other embodiments, the afterburner will further function as a cyclone separator. A large flow of preheated air is injected into the afterburner in a quantity that is typically, but not always, greater than stoichiometric. This lowers the outlet charge temperature of the afterburner, a function that in some embodiments is critical due to the extremely high working temperatures of the plasma chamber exhaust, which becomes the input to the afterburner.

The high air flow that is injected into afterburner 8 lowers its outlet temperature down to where a conventional heat exchanger, which in this embodiment takes the form of a high temperature boiler 9, extracts the heat energy. In the present embodiment, the heat energy is transferred into a feedwater loop 10 coming from a power plant and is returned to the plant with additional heat added via steam outlet 11. The heat energy extracted from the MSW that is delivered to the feedwater is used in place of fossil fuel heat energy in the power plant, thereby increasing the thermal efficiency of the power plant and reducing its fossil fuel consumption. Any form of heat transfer such as generic steam generation to be used in heating or supplement a simple cycle turbine would qualify for generation of renewable energy.

The spent syngas continues through an emissions control device 24. In some embodiments of the invention, emissions control device 24 includes a ceramic media filter (not shown). Commercially available sorbents are injected into respective ones of ports 29 and 30 to reduce emissions of $SO_2$, HCl, Hg, $NO_x$, etc. A low temperature combustion air heat recovery system 14 is used to preheat the afterburner combustion air, which increases efficiency.

A blower 17 provides pressurized ambient air to the low temperature combustion air heat recovery system 14. Blower 17 can be variable speed or valved (not shown) to improve performance, and is controlled by a feedback signal (not shown) responsive to the afterburner air/fuel ratio, the afterburner outlet temperature, or other combustion related parameters.

An induction fan 18 pulls a slight vacuum on the complete system, and in some embodiments of the invention, is designed to utilize a variable speed driver (not shown) to improve system efficiency. A stack 19 is optionally employed in this embodiment as an emergency oxidizer or a simple exhaust stack depending on the redundancy desired in the system design. The stack is useful to consume the fuel in system 100 in emergency situations where the system needs to be shut down quickly.

Figure 2:
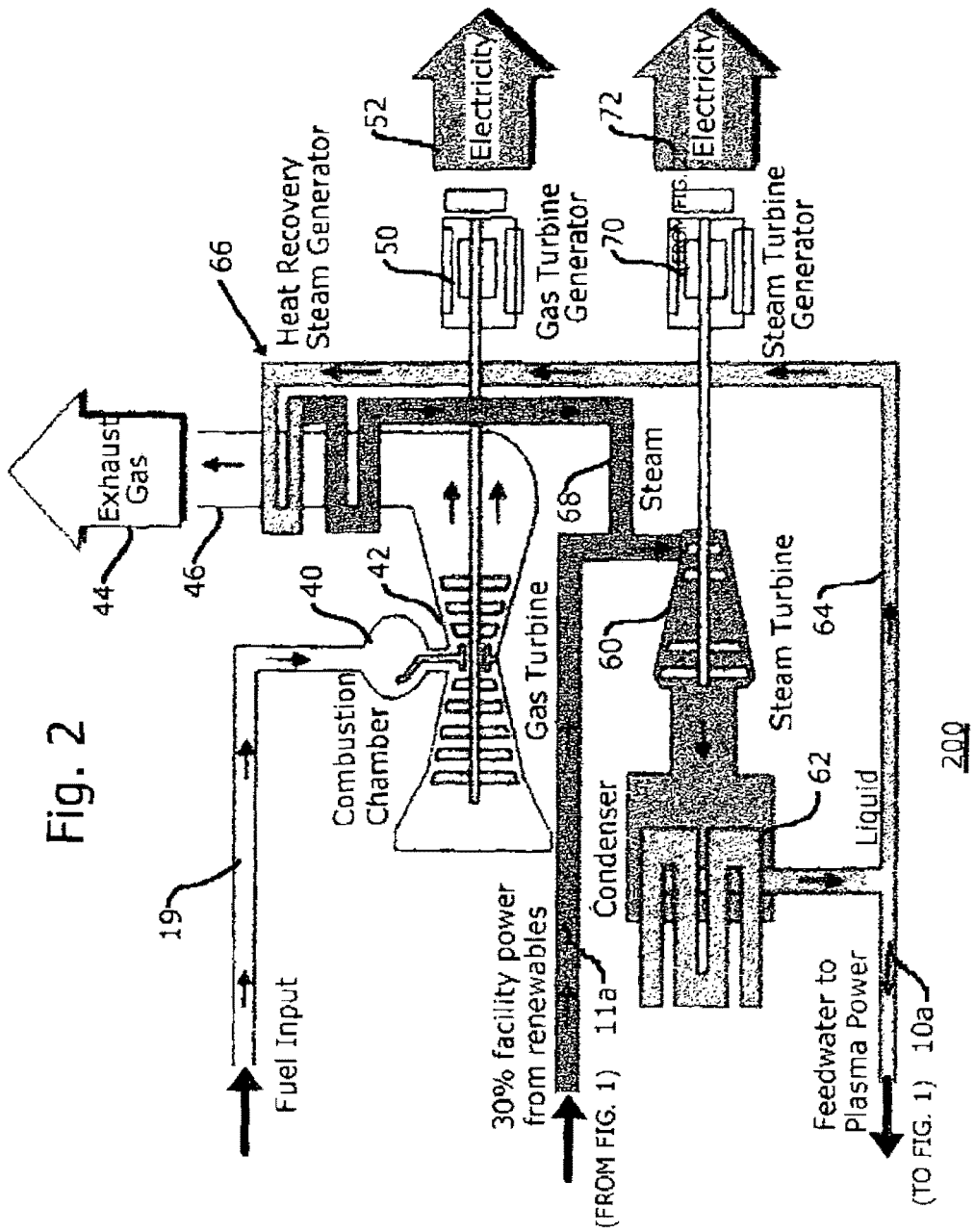
FIG. 2 is a simplified block representation of a modified combined cycle generator.

FIG. 2 is a simplified schematic representation of a combined cycle generator 200 that produces electrical power. Elements of structure that nave previously been discussed are similarly designated. Many of the Rankine cycle components are not required to be used in the feedwater-to-steam system 100 shown in FIG. 1. Instead, these components are present in combined cycle generator 200 shown in FIG. 2, thereby significantly reducing the capital investment needed for the renewable energy facility.

As shown in FIG. 2, fuel is received at fuel input line 19. The fuel input line delivers the fuel to a combustion chamber 40 that supplies the resulting combusted gasses to a gas turbine 42. The exhaust of the gas turbine is issued as exhaust gas 44 via an output line 46. The rotational displacement of gas turbine 42 is coupled by a shaft (not specifically designated) to a gas turbine generator 50 that issues electricity 52.

As a secondary power generation system, there is provided a low steam turbine 60 that operates in the context of a closed loop, as follows: A liquid (not specifically designated) that includes water is present in a condenser 62. The liquid is conducted along a line 64 to a heat recovery steam generator 66 that is disposed in the exhaust path (output line 46) of gas turbine 42. The liquid in line 64 is heated by the exhaust of the gas turbine, and is converted to steam (not specifically designated) in a steam line 68. The steam line supplies the steam to low steam turbine 60, the spent steam output of which is delivered to condenser 62, whereby the spent steam is re-liquified and the cycle is thus repeated continuously.

In this specific illustrative embodiment of the invention, the steam that is provided by high temperature boiler 9 via steam line 11 in FIG. 1 is injected into the combined cycle low steam turbine 60 at steam input line 11a in FIG. 2. In addition, feedwater (not specifically designated) from condenser 62 is issued at outlet port 10a and is delivered to high temperature boiler 9 in FIG. 1 via feedwater input line 10.

Modern combined cycle generator design allows for up to a 60% turn down, or stated another way, the facility can be operated with reasonable efficiency at 40% power. Low steam turbine generator 70 supplies over 50% of the total electrical output of the combined cycle generator. This allows the renewable energy facility's steam output to represent approximately 30% of the total combined cycle's power generation without unstable control characteristics. In addition, this design flexibility allows the turbine manufacturer to include in the design additional capacity into low steam turbine 60 that can be utilized for peaking if desired when a full complement of renewable steam is present and the primary gas generator is running at full load. The combined cycle generator can also be operated with no renewable steam input and a reduced electrical generation using fossil fuel exclusively.

It is to be understood that the invention is not limited in its application to enhancing feedwater for use in a power plant, as any Rankine or other steam process, or any process that requires steam can benefit from the energy transfer system of the present invention.

Although the invention has been described in terms of specific embodiments and applications, persons skilled in the art can, in light of this teaching, generate additional embodiments without exceeding the scope or departing from the spirit of the invention described and claimed herein. Accordingly, it is to be understood that the drawing and description in this disclosure are proffered to facilitate comprehension of the invention, and should not be construed to limit the scope thereof.

What is claimed is:

1. A method of extracting heat energy from a gassifier and delivering the heat energy to a combined cycle power plant, the method comprising the steps of:
   extracting heat energy from a gas product issued by the gassifier; and
   delivering the extracted heat energy to a feedwater of the combined cycle power plant.

2. The method of claim 1, wherein the gassifier is a plasma gassifier.

3. The method of claim 1, wherein the gassifier is inductively heated.

4. The method of claim 1, wherein the gassifier is inductively heated and plasma assisted.

5. The method of claim 1, wherein the gas product is syngas.

6. The method of claim 5, wherein prior to performing said step of extracting heat energy there is provided the further step of combusting the syngas in an afterburner.

7. The method of claim 6, wherein there is provided the further step of injecting recirculated exhaust gas into the afterburner.

8. The method of claim 7, wherein there is provided the further step of varying the flow rate of the recirculated exhaust gas in response to the afterburner temperature characteristic.

9. The method of claim 6, wherein there is further provided the step of supplying an air flow to the afterburner.

10. The method of claim 9, wherein said step of supplying an air flow to the afterburner is performed in excess of stoichiometric to cool an outlet charge of the afterburner.

11. The method of claim 9, wherein said step of supplying air flow to the afterburner is performed at an approximately stoichiometric level.

12. The method of claim 9, wherein said step of supplying an air flow to the afterburner is performed at a variable flow rate.

13. The method of claim 12, wherein there is provided the further step of varying the flow rate of the air flow in response to an air/fuel ratio.

14. The method of claim 12, wherein there is provided the further step of varying the flow rate of the air in response to an afterburner temperature characteristic.

15. A system for providing heat energy from a gasifier to a power plant, the system comprising:
    a gasifier configured to issue a gas product; and
    a heat exchanger, wherein the heat exchanger receives the gas product, extracts heat energy from the gas product, and delivers the heat energy to a feedwater of the power plant.

16. The system of claim 15, wherein the gassifier is a plasma gasifier and is provided with a plasma torch.

17. The system of claim 16, wherein the plasma torch is configured to be cooled with the feedwater of the power plant.

18. The system of claim 15, further comprising a ceramic media filter configured to receive the gas product and to reduce emissions associated with the gas product.

19. A method of extracting heat energy from a gassifier and delivering the heat energy to a combined cycle power plant, the method comprising the steps of:
    extracting heat energy from a gas product issued by the gassifier; and
    delivering the extracted heat energy to a makeup water of the combined cycle power plant.

20. The method of claim 19, wherein the gas product is syngas.

* * * * *